Dec. 13, 1932. R. A. CARLSON 1,890,495
HYDRAULICALLY OPERATED MACHINE TOOL
Filed July 31, 1930 4 Sheets-Sheet 1

Inventor:
By Raymond A. Carlson
Wilson, Dowell, McCanna & Rehm
Attys.

Dec. 13, 1932.   R. A. CARLSON   1,890,495
HYDRAULICALLY OPERATED MACHINE TOOL
Filed July 31, 1930    4 Sheets-Sheet 2

Patented Dec. 13, 1932

1,890,495

UNITED STATES PATENT OFFICE

RAYMOND A. CARLSON, OF ROCKFORD, ILLINOIS, ASSIGNOR TO ROCKFORD DRILLING MACHINE COMPANY, OF ROCKFORD, ILLINOIS, A CORPORATION OF ILLINOIS

HYDRAULICALLY OPERATED MACHINE TOOL

Application filed July 31, 1930. Serial No. 471,987.

This invention relates to hydraulically operated machine tools, and has more particular reference to a hydraulically operated combination drilling and tapping machine.

Hydraulic drives have been applied to various types of reciprocating machine tools, but so far as I am aware, there has been no successful application of such a drive to a tapping machine; it has been generally regarded as too difficult, if not impossible to correlate the hydraulic feed of the head with the drive of the spindle or spindles satisfactorily for accurate thread cutting, and, where the holes to be tapped are too small to permit the use of collapsible taps, so that the spindles have to be reversed for withdrawal of the taps from the work, there were the added problems of attending to the reversal of the spindles at the proper instant and maintaining the proper relation between the return of the head under hydraulic power and the driving of the spindles in the reverse direction. The present invention has for its principal object the provision of a hydraulically operated tapping machine so designed and constructed that the movement of the head and the driving of the spindles are properly correlated and controlled in a thoroughly practical manner for accurate and efficient thread cutting.

A special feature of the machine of my invention consists in having the head engage a positive stop at the end of its forward feed so that pressure will build up in the line. When a predetermined pressure is reached as determined by the setting of a foot valve, a piston is arranged to be moved under hydraulic pressure to actuate a control unit to throw the head into reverse.

Another object of the invention is to provide reversible electric motors for driving the spindles, and means whereby the same are arranged to be stopped at the end of the feed of the heads and reversed simultaneously with the commencement of the return movement at the heads. When the head engages the positive stop at the end of the forward feed, as above stated, so that pressure is built up in the line, the means for reversing the motors is arranged to be operated under hydraulic pressure upon the commencement of the return feed movement of the head.

Another object is to provide dogs on the head for operating limit switches in the movement of the head to control the operation of the motor. Thus, in the return of the head, the motor, which is turning in the reverse direction for withdrawal of the taps, is stopped when the taps get clear of the work and its direction of rotation changed to forward again. In the case of the tapping of blind holes, a limit switch may be provided in connection with a dog on the head to stop the motor at the instant the head reaches the end of its forward travel so as not to injure or break the taps, the motor being arranged to be reversed coincident with the commencement of the return of the head in the manner previously indicated.

Still another object of this invention is to provide a control unit for controlling the operation of the hydraulic pump, the said unit being manually operable by means of a control lever to start the cycle of operations and being operable by dogs in the travel of the head so as to change from traverse to feed, and also arranged to be operated hydraulically at the end of the forward travel when pressure in the line is built up to a predetermined point by reason of the engagement of the head with the positive stop, as previously indicated.

A still further object consists in the provision of a hydraulic system in which an ordinary hydraulic circuit is provided for the traverse, feed and return of the head under hydraulic power for the purpose of drilling and in which by simply opening certain valves to establish communication with other branches of the system additional circuits are provided for to take care of the hydraulic operation of the motor reversing means and the control unit operating means for reversing the direction of feed of the head as required in tapping.

The invention embraces these and other objects, all of which will be discussed in detail in the following specification, in connection with which attention is called to the accompanying drawings, wherein—

The same reference numerals are applied to corresponding parts throughout the views.

Figure 1:
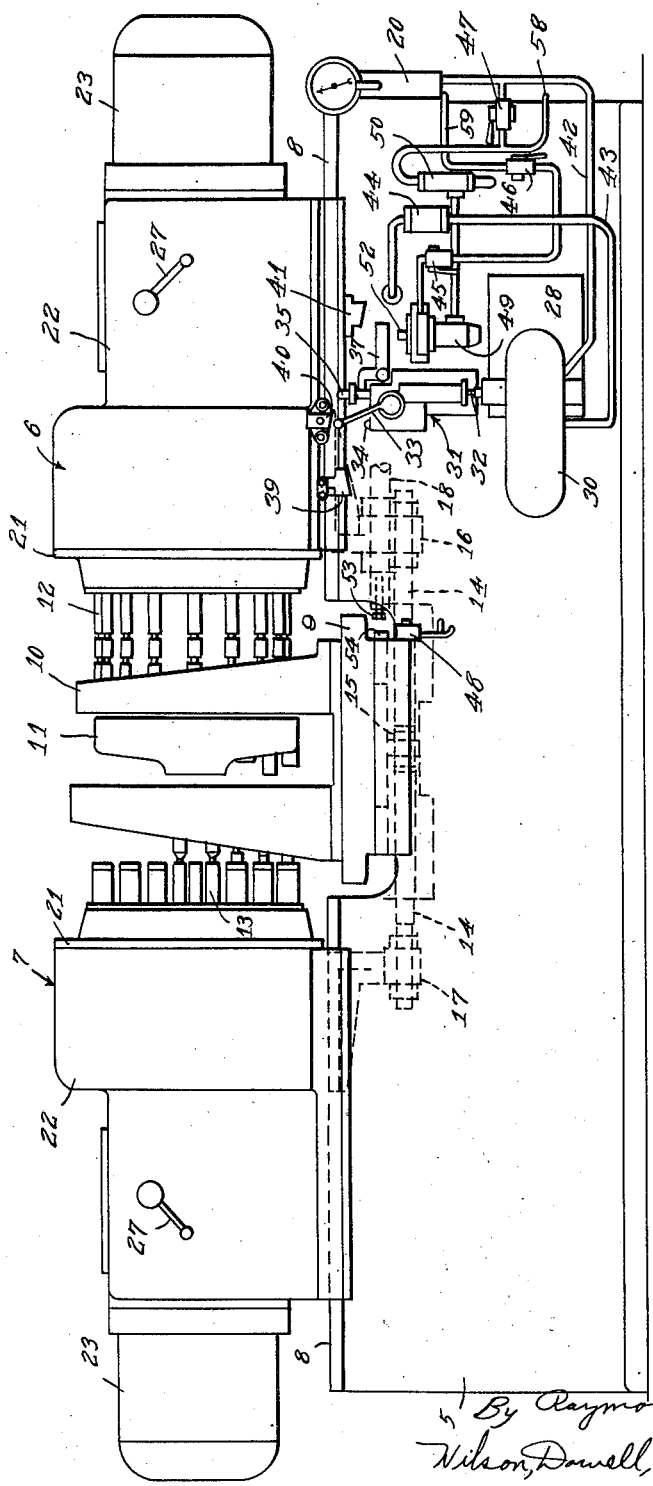
Figure 1 is a front view of a combination drilling and tapping machine made in accordance with my invention, this particular machine being a double-end or two-way, horizontal type.

Referring first to Figure 1 in which I have shown a double-end or two-way machine for drilling and tapping, the numeral 5 is applied to the bed having the heads 6 and 7 reciprocable on ways 8 at opposite ends thereof with reference to a table 9 at the middle of the bed on which the fixture 10 carrying the work 11 is mounted, as shown. Although, of course, the machine may be used in the drilling and tapping of most any kind of work, in this particular case the work 11 happens to be a gear cover casting for a large tractor requiring the drilling and tapping of holes some from one side and the rest from the other side, which is taken care of by properly located spindles 12 and 13 on the heads 6 and 7, respectively. Suitable means, such as pins, are provided for supporting the work in the fixture in a predetermined position relative to the spindles, and bushings may be provided in the fixture to act as guides for the drills during the drilling operation, said bushings being of a special design arranged to be removed when the drills are replaced by tap holders, so as to permit the tap holders to pass through the fixture to reach the holes that have been drilled and take care of the tapping thereof. It should be understood, however, that while the invention is illustrated as applied to a two-way machine, it is equally applicable to one-way, three-way and other plural-way machines, and that while the invention is illustrated as applied to a horizontal type machine, it is applicable also to vertical or other type machines. In passing, it should be observed that the heads are interconnected by means of racks 14 meshing with an intermediate gear 15 from opposite sides thereof, the said racks extending from brackets 16 and 17 depending from heads 6 and 7, respectively. In that way the heads approach the work simultaneously from opposite sides thereof, stop at the same instant upon completion of the drilling or tapping operation, and then simultaneously back away. A single working cylinder is, therefore, sufficient to take care of the hydraulic operation of the heads. Thus, a rod 18 is attached to the bracket 16 and has a piston 19 thereon reciprocable in the working cylinder 20, as indicated in dotted lines in Fig. 2. If desired, however, a separate working cylinder may be provided for each head, in which event separate controls of the kind hereinafter described could also be provided for each head. It should also be observed in passing that the heads are self-contained units each having a spindle face plate 21 at the front end of the housing 22 and an electric motor 23 at the other end. Change gearing is provided in the housing 22 for the driving of the spindles at either of two speeds; a faster speed for drilling and a slower speed for tapping. The set of gears for drilling is shown at 24, and those for tapping at 25 in Fig. 2, and a clutch 26, shiftable from the outside of the housing by means of a lever 27, is provided for the selection of either speed. Of course, there is the usual cluster of gears behind the spindle face plate to provide the proper gear ratios for the different spindles according to the lead of the taps operated thereby, so that with a given feed of the head, each spindle will have a speed proper for the lead of the tap carried thereby. Floating tap holders will, of course, be used to compensate for any slight variation in the feed of the head under hydraulic power and for any slight difference in the way the various taps take their lead.

A pump 28, constituting the source of oil or other motive fluid under pressure, is mounted in the front of the bed and is driven by an electric motor 29 mounted at the back of the bed, a chain and sprocket connection being provided therebetween inside a guard 30. The pump may be of any suitable or preferred type capable of delivering oil at a low rate suitable for feed purposes and at a high rate suitable for traverse purposes and, if necessary, a variation of the rate of delivery to suit different conditions. Such a pump is the QSA pump manufactured by the Oilgear Company, Milwaukee, Wisconsin. This pump gives the same low and high rate delivery for both directions, so that the feed forward and reverse is the same as near as possible. A control unit 31 is provided, made in accordance with my copending application, Serial No. 340,208 filed February 15, 1929, and is connected with the reciprocable valve stem 32 to shift the same to different positions to provide for a cycle either in the form of quick approach, feed, and quick return, or in the form of quick approach, feed, reverse feed, and quick return. As described in said application, the hand lever 33 has connection with a pinion disposed between two racks, on one of which is mounted a plunger 34 and on the other a plunger 35 so that as one plunger is raised, the other is lowered, and vice versa, the plunger 35 being directly connected with the valve stem 32. A spring-actuated load and fire mechanism is provided in connection with the plunger 35 which is cocked by swinging of the lever 33 to the left, raising the plunger 35 and lowering the plunger 34, and the mechanism is held cocked by a trigger arranged to be released by a plunger 36 disposed parallel with the plunger 35 and directly behind the same. A lever 37, pivoted at 38 on the side of the bed, extends over the end of the plunger 36 for depression thereof. A dog 39 provided on the side of the head 6 is arranged to depress the plunger 34, and another dog 40, disposed in a predetermined spaced relation to the dog 39, is arranged to depress the plunger 35. Still another dog 41 is provided on the head 6 to the right of the dog 40 and behind the plane of the dogs 39 and 40 so as to encounter the upper end of the lever 37 to depress the plunger 36. A pipe 42 provides connection between the pump 28 and one end of the working cylinder 20, while another pipe 43 provides connection between the pipe and the other end of the working cylinder through a foot valve 44. Now, there are three valves 45, 46 and 47 which when opened provide communication between this much of the hydraulic system and the other branches, which will be described in detail hereinafter. These valves are kept closed while the machine is performing a drilling operation, but are opened when the machine is used for tapping. There is, therefore, enough of the machine described to intelligently follow the steps of a drilling operation.

In drilling with this machine, assuming that the operator has mounted drills on the spindles, has shifted the levers 27 to drilling position, and has pressed the proper buttons on the switch panel 48 to start the motors 23 and 29, it is only necessary for him to pull the lever 33 to the left to raise the plunger 35 and with it the valve stem 32 to cause the pump 28 to deliver a large volume of oil through the pipe 42 to the working cylinder 20, and thereby cause the heads to commence the quick approach toward the work from opposite sides thereof. As oil enters the one end of the cylinder 20 through pipe 42, oil is discharged from the other end through the foot valve 44 and pipe 43 back to the sump of the pump 28. At a certain point in the travel of the heads when the points of the drills are about to touch the work, the dog 40 encounters the plunger 35 and forces it downwardly and shifts the valve stem 32 to feed position so that the heads move slowly for proper feed of the drills. When the drills are through the work, the dog 41 comes into contact with the lever 37 which presses downwardly on the plunger 36 to release the trigger of the load and fire mechanism, whereupon the plunger 35 is thrown down suddenly and shifts the valve stem 32 to rapid return position. This results in a high rate of delivery of oil through the pipe 43 and through foot valve 44 to the working cylinder 20 to back the heads quickly away from the work.

The depression of the plunger 35 is accompanied with the raising of the plunger 34 and at a predetermined point in the travel of the heads, the dog 39 encounters the plunger 34 and depresses the same enough to raise the valve stem 32 to neutral position, thereby bringing the heads to a standstill, ready for the next cycle after the unloading and loading of work in the fixture. The operator can at this time stop the motors 23 and 29 by depression of proper buttons on the panel 48. The operation of so much of the machine thus far described conforms more or less to the co-pending application in which the control unit 31 is covered. The present application is concerned with this unit only in so far as it forms a part of the general combination and arrangement of elements employed in the present machine.

Figure 2:
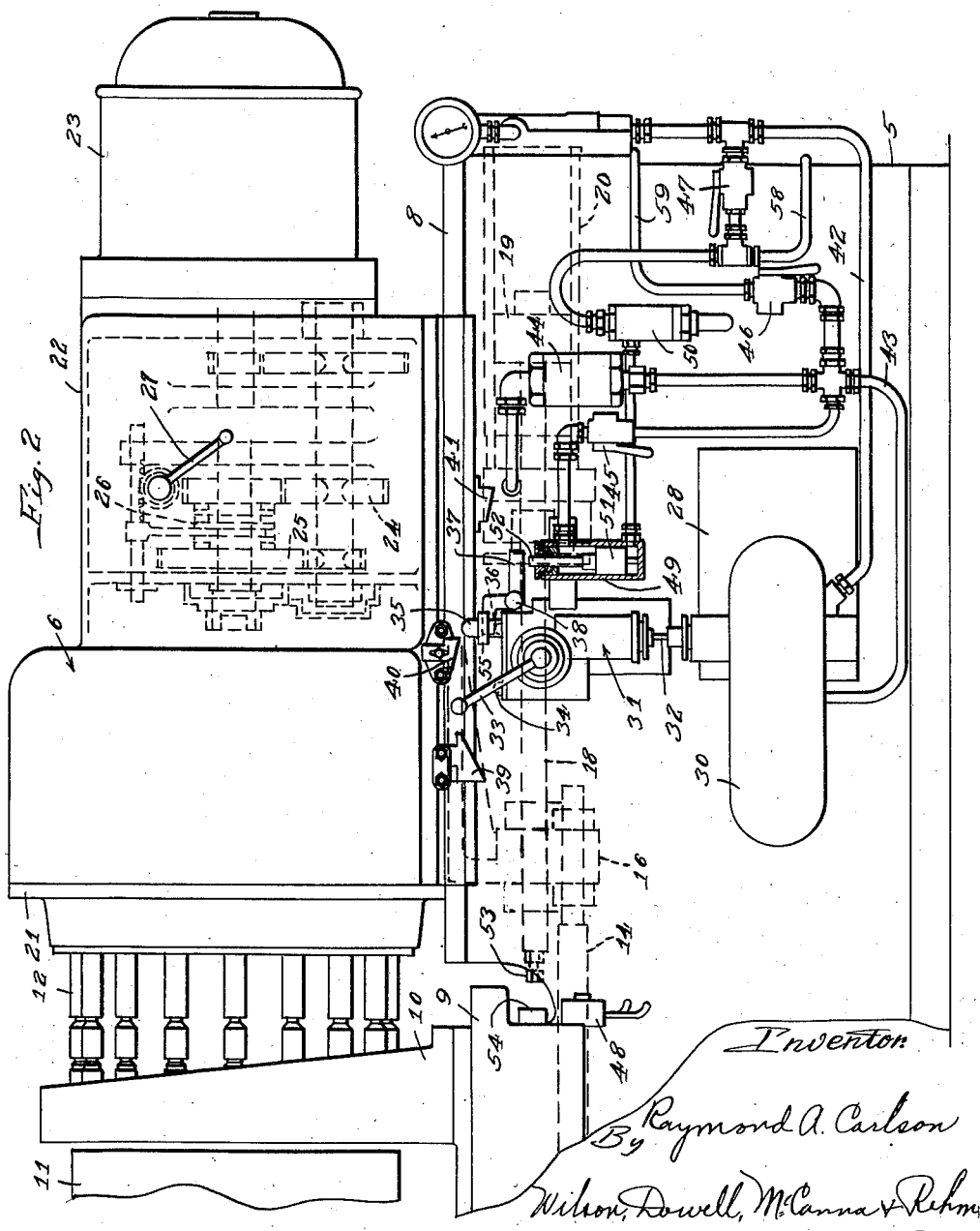
Fig. 2 is a front view of the right hand end of the machine of Figure 1 shown on a larger scale.

When the machine is used for tapping, the valves 45, 46 and 47 are opened to establish communication between that part of the hydraulic system above described and other branches which will now be described. When the valve 45 is opened, communication is established between the upper end of a small hydraulic cylinder 49 and the pipe 43. The opening of the valve 47 establishes communication between the lower end of the cylinder 49 and the pipe 42 through a foot valve 50 which is set for a predetermined resistance to opening, say from two hundred to five hundred and sixty pounds pressure, the purpose for which will presently appear. A piston 51 is provided in the cylinder 49 and has the rod 52 thereof projecting upwardly to a point beneath the lower end of the lever 37 for operation of the latter to depress the plunger 36 of the control unit 31. The bracket 16 on the head 6 has an adjustable set screw 53 threaded thereon when the machine is to be used for tapping, and it is arranged to engage a positive stop or abutment 54 when the head reaches the limit of its forward feed. When that occurs, oil is being delivered to the working cylinder 20 through the pipe 42, and practically the instant the movement of the head is stopped, pressure builds up in the line above the normal pressure and overcomes the resistance of the foot valve 50, so that fluid under high pressure is delivered to the lower end of the cylinder 49. In that way the piston 51 is forced upwardly abruptly and kicks the lever 37 and depresses the plunger 36. In the upward movement of the piston 51 any fluid in the cylinder above the piston escapes through valve 45 to the return pipe 43. I previously described how the depression of the plunger 36 is arranged to release a trigger for a load and fire mechanism to force the plunger 35 downwardly. When the machine is used for drilling and quick return of the head is satisfactory, the plunger 35 is not limited in its downward movement and will, therefore, move past an intermediate return feed position to quick return position, but when the machine is used for tapping, a collar, such as that indicated most clearly at 55 in Fig. 2, is provided, fastened onto the plunger 35 suitably by means of a set screw, and is arranged to limit the downward movement of the plunger 35 to return feed position. So much for this additional branch of the hydraulic system. Another branch related thereto will now be described.

Figure 3:
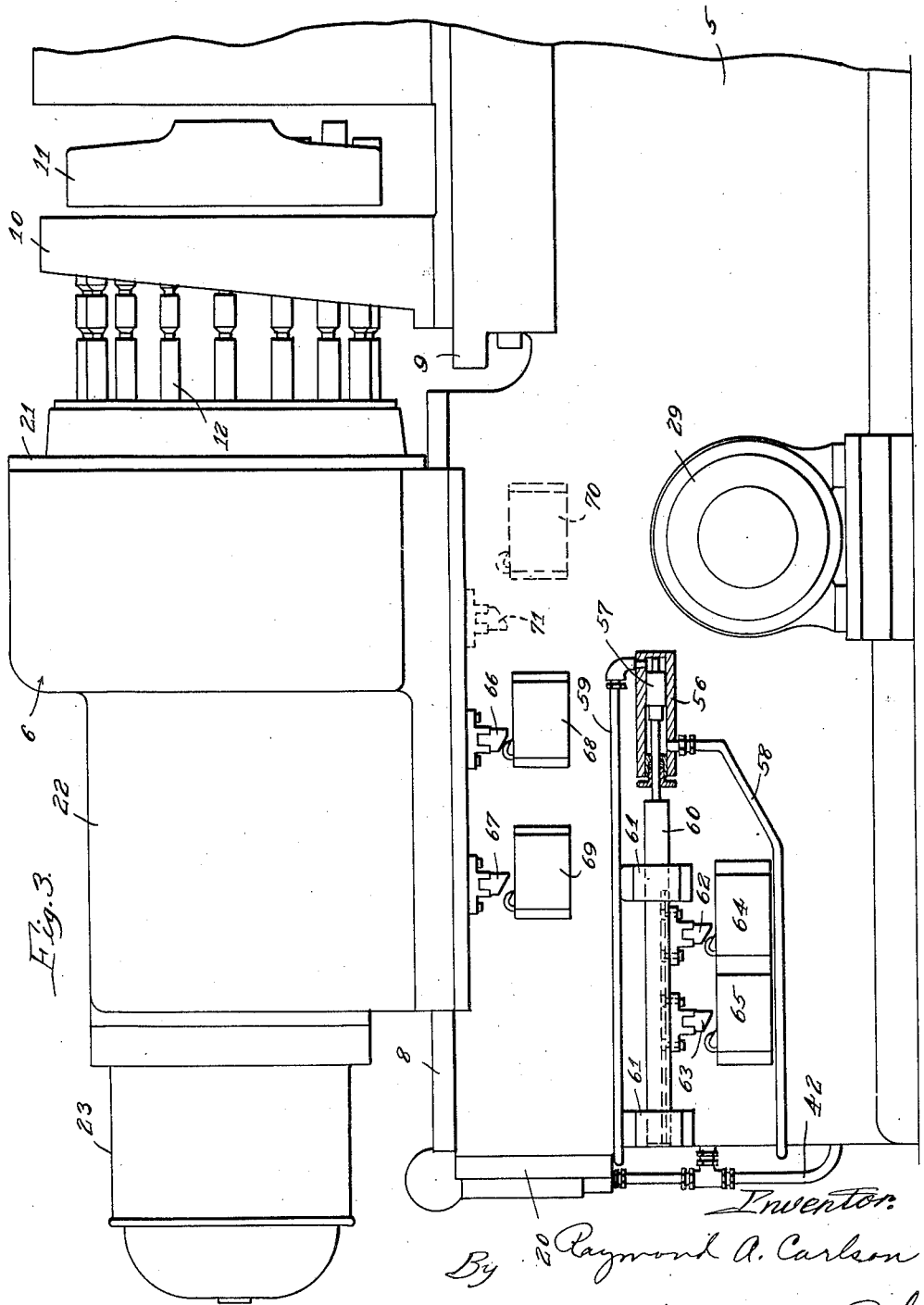
Fig. 3 is a rear view of Fig. 2.
Figure 4:
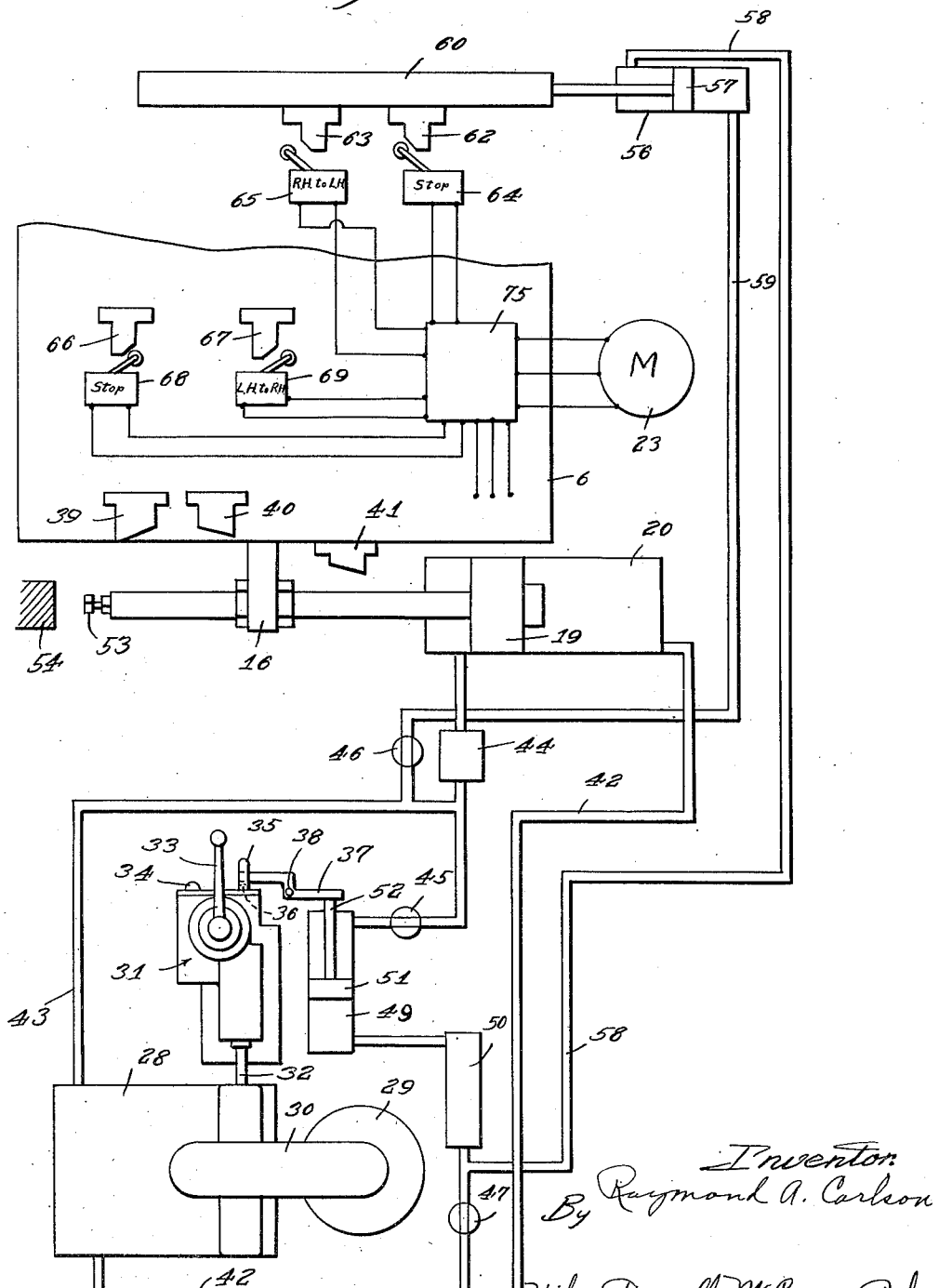
Fig. 4 is a combined hydraulic and electrical wiring diagram of the machine.

A small hydraulic cylinder 56 is mounted on the back of the bed 5, as shown in Fig. 3, and has a piston 57 reciprocable horizontally therein. A pipe 58 extends from the valve 47 for connection with one end of the cylinder 56, and another pipe 59 extends from the valve 46 for connection with the other end of said cylinder. When oil under pressure is delivered to the cylinder 56 through pipe 59, the piston 57 is moved to the left as viewed in Fig. 3 to communicate similar movement to a slide 60 which operates in guides 61 provided on the back of the bed. Two dogs 62 and 63 are adjustably mounted on the slide 60 for cooperation with limit switches 64 and 65, respectively. Similar dogs 66 and 67 are provided on the head 6 for cooperation with limit switches 68 and 69. The electric motors 23 for driving the spindles are reversible and arranged to operate at the same speed in either direction. Any suitable type of motors may be used, such as squirrel cage motors, they being adapted to operate at the same speed and to develop the same power in either direction. The limit switch 64 is arranged to stop the right hand rotation, and limit switch 65 is arranged to start left hand rotation. Limit switch 68 is arranged to stop left hand rotation, and limit switch 69 is arranged to start right hand rotation. These limit switches are momentary contact switches and control magnetic switches provided in a control box, such as that indicated at 75 in Fig. 4. This method of control of electric motors is well known and switches of this type are in common use. In operation, assuming that the motors 23 are in right hand rotation, in tapping right hand threads, the heads proceed on forward feed until the set screw 53 engages the stop 54. At this instant, as previously described, the pressure builds up in the line and the plunger 36 of the control unit 31 is actuated by hydraulic operation of the piston in the cylinder 49, and the piston 57 is also moved to the right by a parallel flow of oil through pipe 58 to the cylinder 56, any oil in the cylinder in front of the piston being discharged through pipe 59 and valve 46 back to pipe 43. The piston 57 is, therefore, in readiness for the operation which is to occur at the instant the head 6 is thrown into return feed. When that occurs, oil is delivered through pipe 43 to the working cylinder 20 to return the head at approximately the same rate of feed as in forward feed. In addition to the delivery of oil to the working cylinder, oil is delivered under pressure through pipe 59 at the same instant to the cylinder 56, thereby moving the piston 57 abruptly to the left. The dog 62 first encounters the roller of the limit switch 64 and stops the motors 23, and almost at the same instant but just a trifle later the dog 63 encounters the roller of the limit switch 65 and throws the motors 23 into left hand rotation. The spindles are, therefore, turning in the proper direction for withdrawal of the taps as the heads back away from the work. At a certain point in the return feed of the heads, when the taps get clear of the work, the dog 66 encounters the roller of limit switch 68 and stops the motors 23, and immediately thereafter the dog 67 encounters the roller of limit switch 69 and throws the motors 23 back into right hand rotation. In the tapping of blind holes it becomes necessary to provide another limit switch 70 and another dog 71 on the head for cooperation therewith. Then, when the taps have gone the required depth, the dog 71 encounters the roller of the limit switch 70 to stop the motor at the same instant that the set screw 53 encounters the stop 54. If necessary, a magnetic brake can be provided in the motors to bring the spindles to a quick stop at the instant the dog 71 encounters the limit switch 70. In that way there will be no danger of injury or breakage of taps. The limit switch 70 should be connected in series with the limit switch 64 so that in case a tap engages the work where a hole has not been drilled, the machine will be thrown into reverse to back the heads away from the work and avoid injury to the taps, it being obvious that the effect in such a case would be the same as when the set screw 53 engages the stop 54. Likewise, in case a tap breaks off in a partly tapped hole, the machine will be thrown into reverse and the heads backed away from the work.

In setting the machine for tapping after it has been used for drilling, the set screw 53, which is left off during the drilling, is replaced, and the dogs 62, 63, 66 and 67, which were locked in an out-of-the-way position, are released for cooperation with the limit switches 64, 65, 68 and 69, respectively. The collar 55, which is left off during drilling, is applied to plunger 35 and the levers 27 are swung from the drilling position to the tapping position so that the spindles are operated at the slower speed suitable for tapping. The drills in the spindles are replaced by tapping collets which are inserted in the spindles and fitted with taps. The motors 29 and 33 are started by pressing the proper buttons on the panel 48. The machine is then in readiness for the tapping operation.

To start the tapping operation, the operator pulls the lever 33 to the left, the same as in drilling, and the heads are thrown into quick approach so as not to lose any time in bringing the taps up to the work. When the taps are about to enter the holes in the work, the dog 40 encounters the plunger 35 and throws the heads into forward feed. In this feed movement the hydraulic feed of the head is exactly proportioned to the speed of the spindles for the taps to take their leads properly. The float of the tap holders allows for such slight variation as there may be. When the holes are tapped, the set screw 53 encounters the stop 54 and further movement of the head is prevented, and, as described above, the building up in pressure in the line results in admission of oil under pressure to the cylinder 49 when the valve 50 blows off, and the lever 37 is actuated to depress the plunger 36 of the control unit to shift the valve 32 to return feed position. There is an almost imperceptible time interval involved in this building up in pressure and there is, consequently, no danger of stripping threads, particularly since there is enough float allowed in the tap holders. Where the holes are blind, the motors are arranged to be stopped, as above described, by cooperation of the dog 71 with the limit switch 70 at the instant the set screw 53 encounters the stop 54, and in that way there is no danger of injury or breakage of taps. Simultaneously with the reversal of the connections between the working cylinder 20 and the pump 28, as fluid is delivered to the cylinder through pipe 43, fluid is also delivered through pipe 59 to the cylinder 56 to move the slide 60. That brings about the stopping of the motors and the reversal thereof so that the taps are unthreaded from the work as the heads back away on return feed. There is a slight difference in the speed at which the head returns, owing to the fact that the piston rod 18 accounts for a certain displacement in the working cylinder and makes for a slightly faster return feed. However, that difference can be avoided by providing a piston rod on both sides of the piston, or else arrangement can be made so that the spindle rotation is increased in reverse. There is actually no need for such provisions, however, inasmuch as the proper float can be provided in the tap holders. When the taps get clear of the work, the dog 66 encounters the limit switch 68 to stop the reverse rotation, and thereafter the dog 67 encounters limit switch 69 to throw the motors 23 back into right hand rotation.

It is believed the foregoing description conveys a clear understanding of all of the objects and advantages of my invention. The appended claims have been drawn with a view to covering all legitimate modifications and adaptations.

I claim:

1. In a machine tool adapted for tapping, the combination of a base, a carriage reciprocable thereon having one or more spindles carried thereby and arranged to be fitted with taps, a reversible electric motor for driving said spindles, means for controlling said motor to stop and reverse the same at the end of forward movement of said carriage, a working cylinder associated with the carriage, a source of pressure fluid supply so constructed and operated for delivering fluid to said cylinder to give the carriage lineal movement proportionate to the speed of said motor, whereby the taps will cut accurate threads and will effect proper withdrawal from the work, and means controlling admission of fluid from said source to either end of said cylinder, adapted to cause stopping and reversal of the carriage simultaneously with stopping and reversal of said motor.

2. In a machine tool adapted for tapping, the combination of a base, a carriage reciprocable thereon carrying one or more spindles arranged to be fitted with taps, a reversible electric motor for driving the spindles in either direction, a reversing switch for said motor, a working cylinder associated with the carriage, a source of pressure fluid supply so constructed and operated for delivering fluid to said cylinder to give the carriage lineal movement proportionate to the speed of said motor, whereby the taps will cut accurate threads and will effect proper withdrawal from the work, means controlling communication between the source and the working cylinder arranged to reverse the delivery of fluid from one end of the cylinder to the other at the end of the forward movement of the carriage, and fluid operated means for operating the reversing switch, said means being adapted to have fluid delivered thereto when the carriage reaches the end of its forward movement.

3. In a machine tool adapted for drilling and tapping, the combination of a base, a carriage reciprocable thereon and carrying one or more spindles arranged to be fitted with drills or taps, an electric motor for driving the spindles, a source of pressure fluid supply, fluid operated means communicating therewith for moving the carriage back and forth, the said electric motor being reversible, hydraulically operated means for reversing the motor, the said means being arranged to communicate with said pressure fluid source simultaneously with the reversal of the carriage at the end of the forward movement thereof, and manually operable valve means for isolating the last mentioned means from communication with the source to prevent reversal of the electric motor during the performance of a drilling operation.

4. In a machine tool adapted for tapping, the combination of a base, a carriage reciprocable thereon equipped with one or more spindles arranged to be fitted with taps, a source of pressure fluid supply, fluid operated means normally communicating with said source to move the carriage forwardly, there being a positive stop for engagement by the carriage at the end of its forward movement whereby pressure is arranged to be built up in the line, fluid operated means in the line arranged to be actuated when a predetermined pressure is reached to change the communication between the last means and the source to reverse the movement of the carriage, a reversible electric motor for driving the spindles, the same being arranged to operate in one direction in the forward movement of the carriage and in the opposite direction in the return thereof, and means for reversing the motor, the last mentioned means being operable when the carriage reaches the end of its forward movement.

5. A machine tool as set forth in claim 4 including in combination with the last mentioned means fluid operated means for operating the same arranged to be operated from the source of pressure fluid supply coincident with the reversal of movement of the carriage.

6. A machine tool as set forth in claim 4 including in combination with the last mentioned means fluid operated means for operating the same arranged to be operated from the source of pressure fluid supply coincident with the reversal of movement of the carriage, and manually operable valve means for isolating the fluid operated means from the source of pressure fluid supply.

7. In a machine tool, the combination of a base, a carriage reciprocable thereon having one or more spindles carried thereby and arranged to be fitted with taps or other tools, means for moving said carriage forwardly and returning the same, a reversible electric motor for operating the spindles, said carriage moving means being operable by fluid pressure, a source of pressure fluid supply communicating with said means one way for forward movement of the carriage and another way for return movement, switches for controlling the circuit for the motor to stop normal rotation in one direction and start rotation in the opposite direction, fluid operated means arranged to have pressure fluid delivered thereto from said source at the same time that the fluid delivery for operation of the carriage is changed for return movement of the carriage, whereby to operate said switches at the instant of the reversal of the carriage and have the spindles turn in the reversed direction during return of the carriage, other switches for stopping reverse rotation and changing back to normal rotation, and means arranged to operate said switches at a predetermined point in the return movement of the carriage.

8. In a machine tool adapted for tapping, the combination of a base, a carriage reciprocable thereon carrying one or more spindles arranged to be fitted with taps, a reversible electric motor for driving the spindles in either direction, a reversing switch for said motor, a working cylinder associated with the carriage, a source of pressure fluid supply so constructed and operated for delivering fluid to said cylinder to give the carriage lineal movement proportionate to the speed of said motor, whereby the taps will cut accurate threads and will effect proper withdrawal from the work, a valve controlling the delivery of pressure fluid from said source to said cylinder whereby to deliver fluid to one end of the cylinder or the other end according to the direction of carriage movement desired, said valve being in a certain position in the forward movement of the carriage, a stop disposed for engagement by the carriage at the end of its forward movement, the pressure of the fluid in said cylinder being built up from said source beyond normal operating pressure when the carriage engages the stop, and fluid operated means operable at pressures above the normal operating pressure for substantially simultaneously operating the reversing switch and moving the control valve to its reverse position.

9. In a machine tool adapted for tapping, the combination of a base, a carriage reciprocable thereon carrying one or more spindles arranged to be fitted with taps, a reversible electric motor for driving the spindles in either direction, a reversing switch for said motor, a working cylinder associated with the carriage, a source of pressure fluid supply so constructed and operated for delivering fluid to said cylinder to give the carriage lineal movement proportionate to the speed of said motor, whereby the taps will cut accurate threads and will effect proper withdrawal from the work, a valve controlling the delivery of pressure fluid from said source to said cylinder whereby to deliver fluid to one end of the cylinder or the other end according to the direction of carriage movement desired, said valve being in a certain position in the forward movement of the carriage, a stop disposed for engagement by the carriage at the end of its forward movement, the pressure of the fluid in said cylinder being built up from said source beyond normal operating pressure when the carriage engages the stop, fluid operated means operable at a pressure above the normal operating pressure for moving the valve to its reverse position, and means for simultaneously operating the reversing switch.

10. In a machine tool adapted for tapping, the combination of a base, a carriage reciprocable thereon carrying one or more spindles arranged to be fitted with taps, a reversible electric motor for driving the spindles in either direction, a limit switch for said motor, a working cylinder associated with the carriage, a source of pressure fluid supply so constructed and operated for delivering fluid to said cylinder to give the carriage lineal movement proportionate to the speed of said motor, whereby the taps will cut accurate threads and will effect proper withdrawal from the work, a valve controlling the delivery of pressure fluid from said source to said cylinder whereby to deliver fluid to one end of the cylinder or the other end according to the direction of carriage movement desired, said valve being in a certain position in the forward movement of the carriage, a stop disposed for engagement by the carriage at the end of its forward movement, the pressure of the fluid in said cylinder being built up from said source beyond normal operating pressure when the carriage engages the stop, fluid operated means operable at a pressure above the normal operating pressure for moving the valve to its reverse position, and means for simultaneously operating the limit switch.

11. In a machine tool adapted for tapping, the combination of a base, a carriage reciprocable thereon carrying one or more spindles arranged to be fitted with taps, a reversible electric motor for driving the spindles in either direction, a reversing switch for said motor, a working cylinder associated with the carriage, a source of pressure fluid supply so constructed and operated for delivering fluid to said cylinder to give the carriage lineal movement proportionate to the speed of said motor, whereby the taps will cut accurate threads and will effect proper withdrawal from the work, a valve controlling the delivery of pressure fluid from said source to said cylinder whereby to deliver fluid to one end of the cylinder or the other end according to the direction of carriage movement desired, said valve being in a certain position in the forward movement of the carriage, a stop disposed for engagement by the carriage at the end of its forward movement, the pressure of the fluid in said cylinder being built up from said source beyond normal operating pressure when the carriage engages the stop, a limit switch adapted when operated to stop the motor, means for operating said switch when the carriage engages the stop, and fluid operated means operable at pressures above the normal operating pressure for substantially simultaneously operating the reversing switch and moving the control valve to its reverse position.

12. In a machine tool adapted for tapping, the combination of a base, a carriage reciprocable thereon carrying one or more spindles arranged to be fitted with taps, a reversible electric motor for driving the spindles in either direction, a working cylinder associated with the carriage, a source of pressure fluid supply so constructed and operated for delivering fluid to said cylinder to give the carriage lineal movement proportionate to the speed of said motor, whereby the taps will cut accurate threads and will effect proper withdrawal from the work, two separate reversing switch means, the first for reversing the motor at the end of the forward travel of the carriage, and the second for again reversing the motor after withdrawal of the taps from the work, the second being automatically operable in the return movement of the carriage, a valve controlling the delivery of pressure fluid from said source to said cylinder whereby to deliver fluid to one end of the cylinder or the other end according to the direction of carriage movement desired, said valve being in a certain position in the forward movement of the carriage, a stop disposed for engagement by the carriage at the end of its forward movement, the pressure of the fluid in said cylinder being built up from said source beyond normal operating pressure when the carriage engages the stop, and fluid operated means operable at pressures above the normal operating pressure for operating the first reversing switch means and for moving the valve to its reverse position.

13. A structure as set forth in claim 12 including a limit switch cooperating with the first reversing switch means to stop the motor at the instant the carriage engages the stop, and means for automatically operating said switch at the end of the forward movement of the carriage.

In witness of the foregoing I affix my signature.

RAYMOND A. CARLSON.